US011938087B2

(12) United States Patent
Lee et al.

(10) Patent No.: US 11,938,087 B2
(45) Date of Patent: Mar. 26, 2024

(54) INTRAMUSCULAR STIMULATION NEEDLING DEVICE

(71) Applicants: Young Hei Lee, Cresskill, NJ (US); Anna D. Lee, Cresskill, NJ (US); Melody Kim, New York, NY (US)

(72) Inventors: Young Hei Lee, Cresskill, NJ (US); Anna D. Lee, Cresskill, NJ (US); Melody Kim, New York, NY (US)

( * ) Notice: Subject to any disclaimer, the term of this patent is extended or adjusted under 35 U.S.C. 154(b) by 347 days.

(21) Appl. No.: 17/409,596

(22) Filed: Aug. 23, 2021

(65) Prior Publication Data

US 2021/0378911 A1 Dec. 9, 2021

(51) Int. Cl.
*A61H 39/00* (2006.01)

(52) U.S. Cl.
CPC ..... *A61H 39/002* (2013.01); *A61H 2201/123* (2013.01)

(58) Field of Classification Search
CPC ........................ A61H 39/002; A61H 2201/123
See application file for complete search history.

(56) References Cited

U.S. PATENT DOCUMENTS 5,735,868 A * 4/1998 Lee ........................ A61B 90/50 606/189
6,117,156 A * 9/2000 Richter ..................... A61F 2/82 128/898
2014/0114279 A1* 4/2014 Klinghoffer ...... A61M 5/14212 604/173

* cited by examiner

*Primary Examiner* — Catherine M Voorhees
*Assistant Examiner* — Roland Dinga
(74) *Attorney, Agent, or Firm* — Barry Choobin; Patent 360

(57) ABSTRACT

An intramuscular stimulation needling device for chronic pain relief. The needling device can include a stepper motor, a needle, and a control unit. The needle can poke an affected muscle tissue and driven by a stepper motor in reciprocating manner. In each cycle, the needle moves a pre-determined distance forwardly in a first half cycle and retracts to original position in a second half cycle. The control unit can accelerate of the needle one or more times in the first half cycle at spaced intervals and decrease the velocity in the reverse pattern in the second half cycle.

16 Claims, 8 Drawing Sheets

INTRAMUSCULAR STIMULATION NEEDLING DEVICE

FIELD OF INVENTION

The present invention relates to an intramuscular stimulation needling device, and more particularly the present invention relates to a variable speed intramuscular stimulating needling device for treating muscular pain.

BACKGROUND

Intramuscular stimulation (IMS) is a known method for treating musculoskeletal pain by inserting a needle into affected muscle tissue. Intramuscular stimulation was described by Gunn, "Dry Needling of Muscle Motor Points for Chronic Low-Back Pain: A Randomized Clinical Trial with Long-Term Follow-up", Spine, Vol. 5, No. 3, pp. 279-291 (1980). Since then, the intramuscular stimulation method has become quite common for relief in chronic musculoskeletal pains. The musculoskeletal pain caused by tightening of the muscle can be treated by intramuscular stimulation. The tightness of the muscle tends to apply severe pressure or pinching forces to the nerve fibers within the muscle, thereby causing chronic pain. Repeated intramuscular stimulation treatments can make the contracted muscle relax, thereby the pain eventually subsides.

Typically, intramuscular stimulation involves the insertion of a fine needle, similar to an acupuncture needle, into the affected muscle. The needle is driven to reciprocate stimulating the muscle by repeatedly moving the needle back and forth linearly within the muscle. This needle can be reciprocated repeatedly for the desired number of times at different points in several muscular sites. For brevity, such needle manipulation will be referred to as "poking" in the remainder of this disclosure. The frequency of the treatment depends on the severity of the muscle contraction. A severely contracted muscle will require more frequent treatments over longer periods, whereas the required frequency will be less for the lightly injured muscles. Intramuscular stimulation treatment is usually performed at multiple muscle points.

The needle is generally driven by a motorized needling instrument that can reciprocate the needle within a muscle at preset velocity. A person administering the treatment can hold the instrument steadily at the desired treatment site while the motor provides controlled, uniform back and forth linear motion to the needle within a fixed stroke length. For extended intramuscular stimulation treatment sessions, a mechanical swivel arm is provided to hold the stimulator needling instrument, and a footswitch is also provided to remotely turn the motor on and off. In this way, intramuscular stimulation treatments can be performed with minimal physical effort, helping to avoid muscle injury to the person administering the treatment.

U.S. Pat. No. 5,735,868A describes an intramuscular stimulator used for treating patients suffering from musculoskeletal pain such as low back pain, sciatica, shoulder pain, neck pain, headache, etc. It consists of a control unit and a hand piece. The hand piece is a linear actuator that is controlled by the control unit for reciprocating movement of the needle. To operate the device, a sterile disposable needle is first mounted onto the hand piece. A practitioner holds the hand piece and inserts the needle beneath the skin manually to stimulate the target muscle. This mechanical stimulation is performed at a specific muscle region called the trigger points. The trigger points encompass a tight region of a muscle that contains a lot of contraction knots. The contraction knots can result from a muscular injury and/or the nerve irritation due to an accident, lifestyle, or professional hazard. When a trigger point is stimulated mechanically, a sudden muscle contraction called local twitch response (LTR) is elicited sometimes, which relaxes a certain part of the muscle. When local twitch responses are obtained for different parts of an affected muscle, the muscle as a whole relaxes and the pain symptoms subside.

The known needling instruments have been effective in treating chronic muscular pains. However, in some chronic pains, the trigger point zone expands and becomes 'rock-like' hard. For such muscles, needling with an intramuscular stimulator becomes difficult if not impossible. The needle often bends or is unable to penetrate the 'rock-like' muscle zone at all. Naturally, it is very difficult to obtain local twitch responses from such 'rock-like' zones with the intramuscular stimulators of the prior art.

Moreover, the intramuscular stimulators of the prior art have a pre-programmed constant speed and the stroke length of the linear actuator. The known intramuscular stimulators can operate only at a constant speed. This is the biggest drawback of the known intramuscular stimulators.

Thus, a desire is there for an improved intramuscular stimulator that can be effective for treating a range of chronic muscular pains including needling the 'rock-like' muscle zone.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

It is, therefore, a principal object of the present invention for a stronger needling action.

It is another object of the present invention that the treatment time can be reduced.

It is still another object of the present invention that very rigid muscle tissues can be needled quickly and easily.

In one aspect, disclosed is an intramuscular stimulation needling device that can include a stepper motor, a needle, and a control unit. The needle can poke an affected muscle tissue, the needle can be operably coupled to the stepper motor, wherein the stepper motor reciprocates the needle within the affected muscle tissue, wherein in each needling cycle, the needle moves a pre-determined distance (stroke length) forwardly in the first half cycle and retracts to the original position in the second half cycle. The control unit can be operably coupled to the stepper motor, wherein the control unit can accelerate the needle one or more times in the first half cycle at spaced intervals and decelerate the needle in the second half cycle in a pattern reverse to the acceleration of the needle in the first half cycle.

In one implementation of the intramuscular stimulation needling device, the needle can be accelerated once during the first half cycle or the needle can be accelerated twice during the first half cycle, or the needle can be accelerated thrice during the first half cycle, or the needle can be accelerated n times during the first half cycle. The point where the acceleration occurs is arbitrary. The acceleration of the needle can be achieved by shortening the delay time between subsequent pulses that are delivered to the stepper motor. The control unit can include one or more inputs, such a push buttons, for accelerating the needle one or more times.

In one aspect, disclosed is a method for intramuscular stimulation by needling as a therapeutic modality using the disclosed intramuscular stimulation needling device. The needle can be inserted subcutaneously to a desired depth. The control unit can have an option for accelerating the needle by a desired number of times in the first half of a needling cycle. The needle in the second half cycle can be decelerated in a pattern reverse to the acceleration of the needle.

In one implementation of the method, the selected option can be to accelerate the needle once during the first half needling cycle, or to accelerate the needle twice during the first half needling cycle, or to accelerate the needle thrice during the first half needling cycle. The option can be provided as one or more inputs, such as push buttons, in the control unit for accelerating the needle one or more times, wherein each input of the one or more inputs correspond to the number of accelerations.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
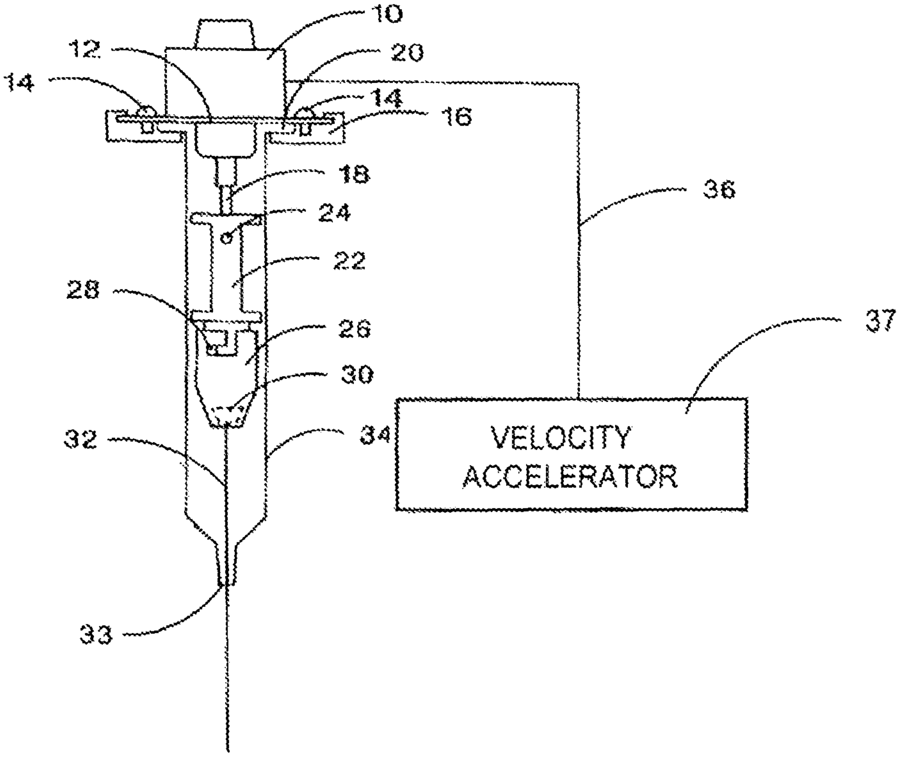
FIG. 1 shows an intramuscular stimulation needling device, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

REFERENCE NUMERALS

10: stepper motor
12: base plate of stepper motor
14: retaining screw
16: syringe holding plate
18: shaft of stepper motor
20: base plate of syringe
22: cylindrical plunger
24: set screw
26: needle holding cap
28: cap retaining pin
30: needle handle
32: needle
33: syringe tip
34: syringe body
36: connecting wire
37: velocity accelerator unit FIG. 1 shows an exemplary embodiment of the intramuscular stimulation needling device. The intramuscular stimulation needling device can include a stepper motor 10 which can reciprocate the needle 32 within a programed stroke length. Herein the phrase "stepper motor" is interchangeably used with the phrase "linear actuator". A syringe body 34 can be coupled to the base plate 12 of the stepper motor. The syringe body 34 can have a syringe tip 33 into which needle 32 can be inserted. The needle 32 can be operably coupled to the shaft of the stepper motor 18 through a cylindrical plunger 22. A needle holding cap 26 can be used to couple the needle 32 to the cylindrical plunger 22.

To operate the intramuscular stimulation needling device, the needle can be first mounted onto the shaft of the stepper motor (18 in FIG. 1) via a coupling (22-30 in FIG. 1). A syringe (34 of FIG. 1) can be then mounted onto the base of the motor (12 in FIG. 1) where the syringe retainer (16 of FIG. 1) is installed. The syringe can be grasped by the practitioner for operating the intramuscular stimulation needling device. The stepper motor is then turned on. The needle is inserted under the skin to the desired depth manually by the practitioner. The practitioner can start needling for a desired time, i.e., when enough local twitch responses have been obtained, the practitioner can manually withdraw the needle out of the skin. There are times when no local twitch responses could be obtained, and in such a case, the practitioner takes the needle out of the skin and then moves to a different needling location.

A linear actuator can be a programmable stepper motor in which its axis movement speed is controlled by the input step pulse rate. The input step pulse rate is programmable by adjusting the delay time between subsequent pulses. Shorter delay time results in faster linear velocity while longer delay time results in a slower velocity. Suppose the axis of a linear actuator moves 0.1 mm per step pulse input. Then, it will take 100 pulses to move the axis by 10 mm. If a delay time of 1 msec is used, then it will take 100 msec for 10 mm movement of the axis, and therefore, the speed will be 100 mm/s (neglecting the time for the pulse width). If the delay time is 10 msec, the speed will be 10 mm/s. A velocity accelerator 37, shown in FIG. 1, is used to control the speed of the axis of the linear actuator. The velocity accelerator 37 can provide a greater force on the needle resulting in more effective needling compared with the case with no acceleration. The velocity accelerator is capable of changing needling velocity during a needling cycle. In other words, the velocity of the needling can be changed during a needling cycle. Velocity acceleration provides increased needling force, and this allows penetration of the needle into "rock-like" trigger point zones to obtain desired local twitch responses readily.

Figure 2:
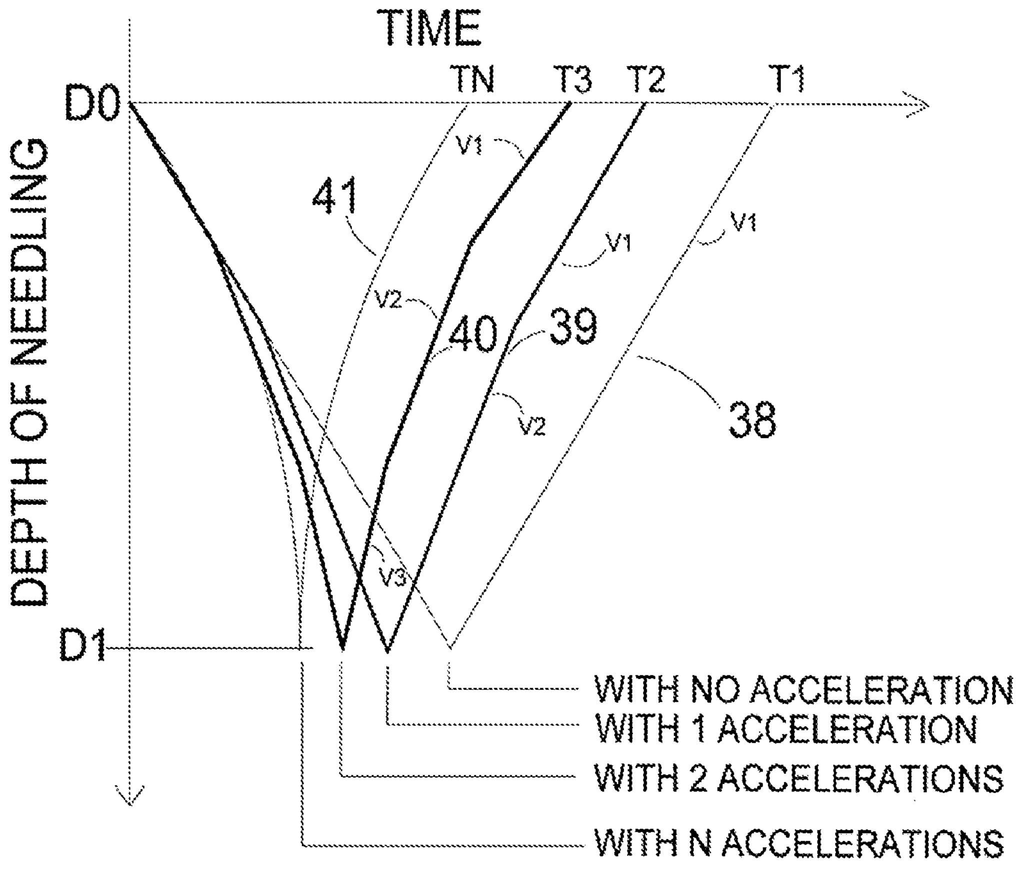
FIG. 2 is a time scale graph showing a change in needling time with variations in the acceleration of the needle, according to an exemplary embodiment of the present invention.

FIG. 2 shows a time scale graph in which the depth of needling is plotted against the duration of needling to illustrate the functioning of the velocity accelerator. D0 is the starting depth of the needling and D1 is the target depth. In the case of the intramuscular stimulators of constant velocity (prior art), the depth of the needle tip increases with time until the depth of D1 is reached. The velocity of the tip, in this case, is constant at V1 where V1=2(D1−D0)/T1 and T1 is the time the needle tip comes back to D0 after one needling cycle. The trace of the needle tip is a straight line designated by 38 in FIG. 2. When the tip of the needle reaches the depth of D1, the needle tip moves in reverse in preparation for the next cycle. This needling cycle is repeated during needling. The period of one cycle is T1, and the needling frequency is 1/T1.

The disclosed velocity accelerator can increase the needling velocity during the first half of the needling cycle i.e., between D0 to D1. It can be increased once, twice, or as many times as desired. For a one-time increase, the initial velocity V1 can be increased to V2 in the middle of the half-cycle as shown by trace 39. For two increases, the initial velocity V1 can be increased to V2 and then to V3 in the middle of the first half cycle, respectively, as shown by trace 40 of FIG. 2. The velocity can be increased as many times as the stepper motor allows, for example, N times at regularly spaced intervals. When there are a lot of increases, the velocity profile becomes smoother as shown by trace 41 of FIG. 2. Note that these velocity increases result in shortening of the needling period—T2 for one-time increase, T3 in case of two increases, and Tn for n times increases at regularly spaced intervals in the first half cycle (see FIG. 2). Note that T3 is shorter than T2, and T2 is shorter than T1.

Figure 2A:
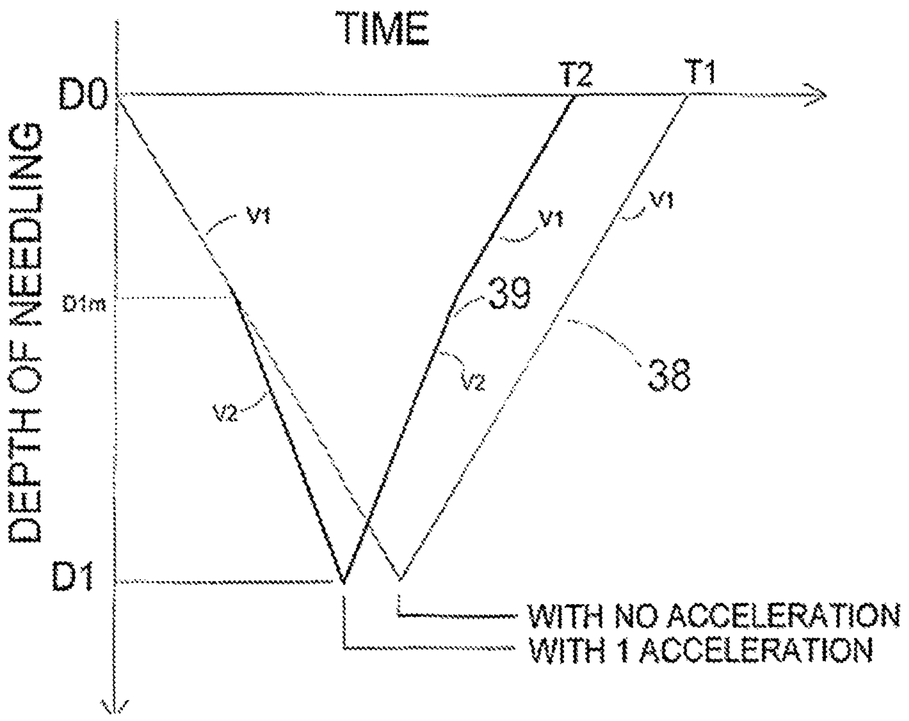
FIG. 2A is a time-scale graph showing needling time in constant velocity needling and single acceleration needling, according to an exemplary embodiment of the present invention.

In one exemplary embodiment, the needle tip can initially move with a velocity V1 after it is inserted under the skin to a depth of D0. D0 can be any depth as chosen by the practitioner. When the needle tip reaches a depth of D1*m* (refer to FIG. 2A), the needle velocity can be increased to V2. Upon reaching the depth D1 (with velocity V2), the direction of the stepper motor is reversed and the needle tip moves in the reverse direction until it is withdrawn to the depth D1*m* again. At this point, the needle tip velocity is again changed back to V1 until the needle tip retracts to its starting point D0. Note that the distance (D1−D0) is the pre-determined stroke length of the needle. FIG. 2A plots the position of the needle tip vs. time. The velocity V1 is the slope of the line between D0 and D1*m*. The velocity V2 is the slope of the line between D1*m* and D1. Compared with the constant velocity case, the needling period for one cycle is decreased from T1 to T2. Note that the needling time for one needling cycle is T1 in the case of constant velocity.

Figure 2B:
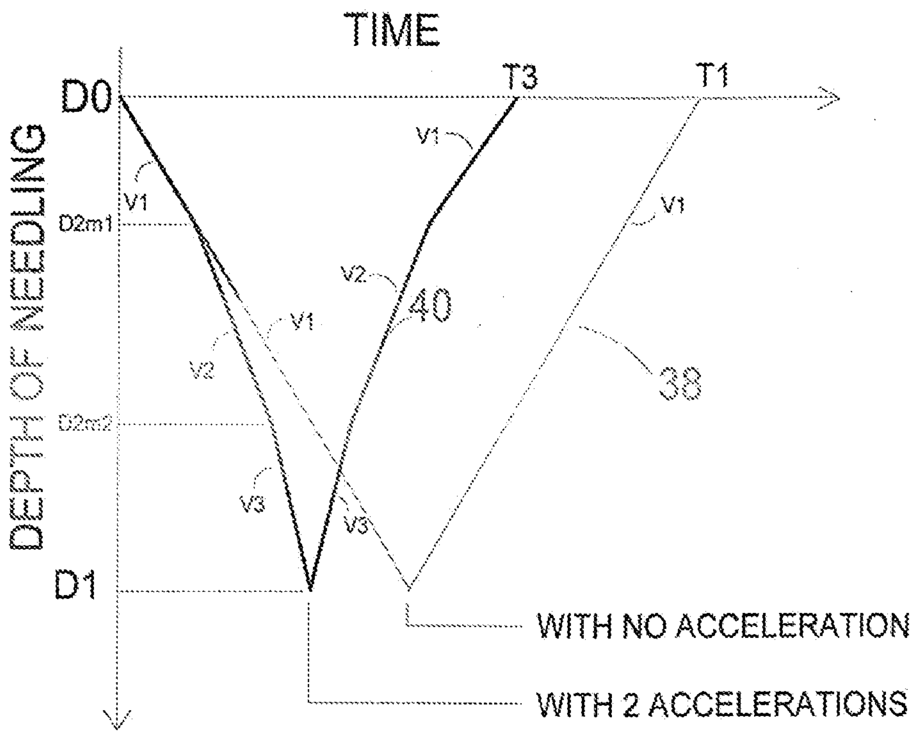
FIG. 2B is a time-scale graph showing needling time in constant velocity needling and twice acceleration needling, according to an exemplary embodiment of the present invention.
Figure 2C:
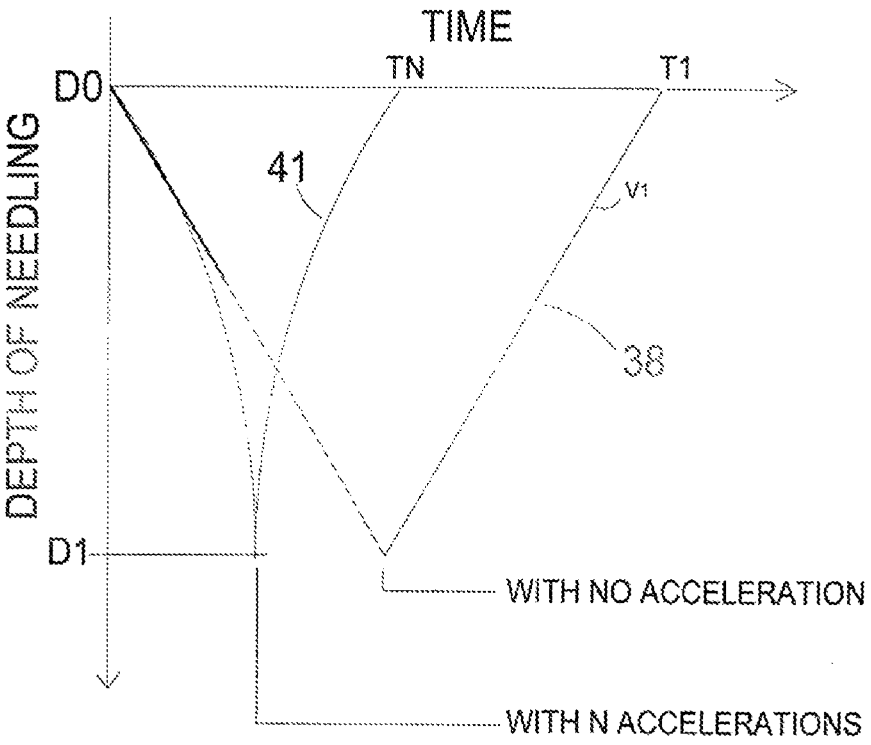
FIG. 2C is a time-scale graph showing needling time in constant velocity needling and N-times acceleration needling, according to an exemplary embodiment of the present invention.

FIG. 2B depicts a pattern of needle (tip) movement when there are two velocity accelerations. The needle tip initially moves with a velocity V1 in the subcutaneous region of the tissue. When the needle tip reaches the depth D2*m*1, the needle velocity can be increased to V2. When the needle tip reaches the depth D2*m*2, the needle velocity is further increased to V3. When the needle tip reaches the depth D1 (with velocity V3), the direction of the stepper motor is reversed and the needle tip moves in reverse until it reaches the depth D2*m*2 (with the velocity V3). At that point, the needle tip velocity is decreased to V2 until it reaches the depth D2*m*1 where the tip velocity is decreased back to V1 until the needle tip comes to a depth of D0 from the skin surface at time T3. Compared with the constant velocity curve, the needling time for one needling cycle is decreased from T1 to T3.

The results of velocity acceleration are stronger penetration force due to the acceleration of velocity and shorter period of needling compared with the intramuscular stimulator of constant velocity. The stronger penetration force enables penetration of the needle into 'rock-like' trigger point zones to obtain LTRs. The shorter periods mean shorter treatment time—a significant advantage for both the patient and the practitioner. The upper limit for the velocity acceleration is the speed limit set by the linear actuator specification. As the speed of a linear actuator increases the thrust force of the motor decreases. Therefore, usable high velocity is limited.

Another advantage of the velocity acceleration is that LTRs tend to be elicited more frequently when the needle tip velocity increases during needling. It has been well known from the manual needling method that LTRs tend to come out more readily when the needle is manipulated in a 'pecking' motion. The 'pecking' is like a bird moving its beak rapidly toward the target food. In such a case, the velocity increases as the beak approach the food. Needling with increasing velocity is closer to this 'pecking' motion.

Figure 3:
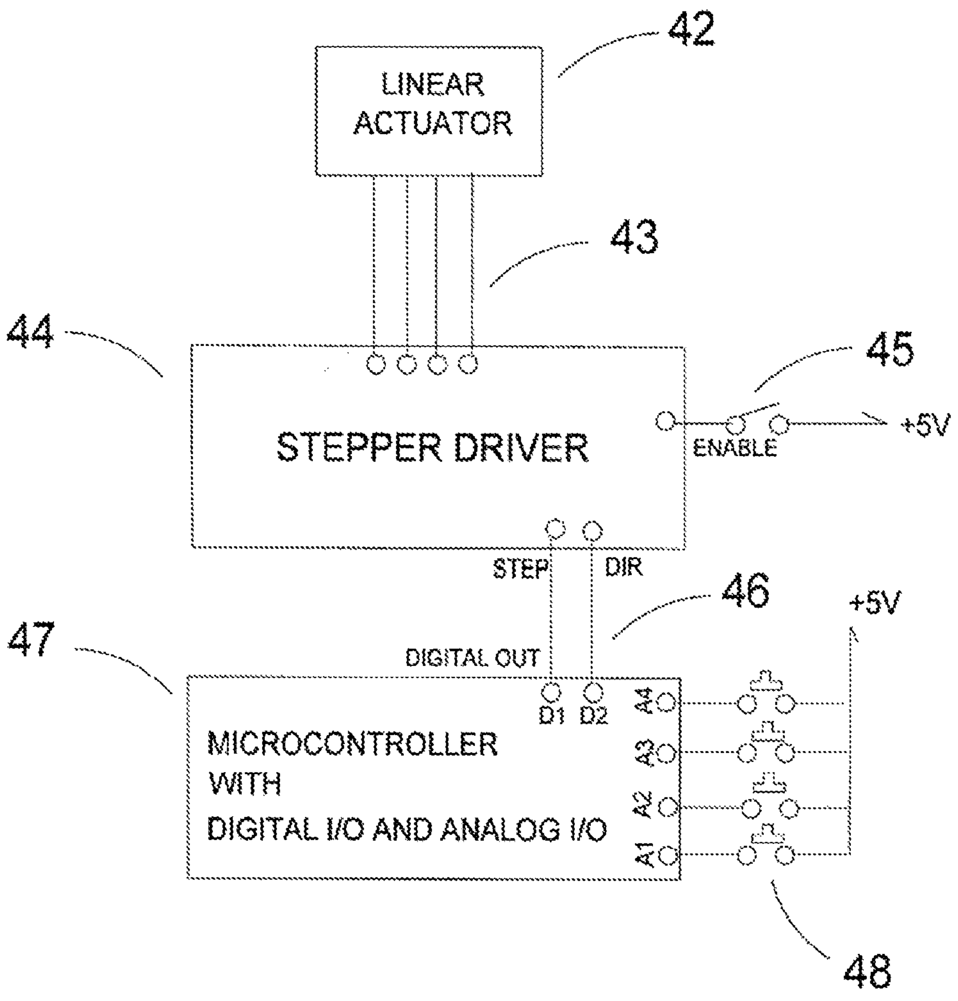
FIG. 3 is a circuit diagram for the intramuscular stimulation needling device, according to an exemplary embodiment of the present invention.

FIG. 3 depicts a circuit diagram for the disclosed velocity accelerator operable coupled to the stepper motor. The circuit can include two integrated circuit chips—a stepper motor driver 44 and a microcontroller chip 47. The stepper motor driver 44 can have a 4-wire output connection 43 to the stepper motor 42 of the hand piece. The number of output connections can be varied without departing from the scope of the present invention. It can also have a 2-wire input connection 46—STEP input and DIR input. The driver 44 can have an ENABLE input 45 that starts or stops the linear actuator upon connecting or disconnecting to +5 V. The ENABLE input 45 can be a push-button that can be depressed to switch between On and Off states. When the ENABLE is on, the stepper motor driver 44 can send pulses to the linear actuator 42 for needling action. The needle attached to the stepper motor axis starts to reciprocate with a stroke length that is pre-programmed in the program uploaded to microcontroller chip 47.

The microcontroller chip 47 of FIG. 3 is a programmable microcontroller equipped with multiple digital input/output and analog input/output. An example of such a chip is ATMEGA328P that has 14 digital input/output ports and 6 analog input ports. Programming of the microcontroller chip is done by a computer. After the program is written on a computer, it can be downloaded to the microcontroller chip 47 via a port, such as a USB port. Once downloaded, the program is executed continuously in a loop when the micro-controller chip is turned on. The role of the microcontroller chip 47 is to send a train of pulses to STEP input and a logic level to DIR input of the stepper driver 44 via two-line connection 46. The STEP input moves the axis of the linear actuator while the DIR input determines whether the axis movement is forward or reverse. The microcontroller chip ATMEGA328P has 6 analog input ports but in the example of FIG. 3, only 4 of them—A1, A2, A3, and A4—have been utilized. These analog input ports are used to select a specific velocity acceleration pattern for the needling. In FIG. 3, the four analog input ports A1, A2, A3, and A4 are connected to 4 push-button switches 48. With 4 analog ports, four different velocity acceleration patterns are available for selection. More analog ports can be used to use more velocity acceleration patterns or fewer analog ports can be used to use less velocity acceleration patterns.

The specification of a stepper motor can give how long the motor axis moves per step input pulse, for example, 0.1 mm per pulse. If such a motor receives 100 pulses, the needle moves 10 mm in one direction determined by the DIR logic level 46. The microcontroller chip 47 can send 100 pulses to the stepper motor so that the needle can move 10 mm in one direction. After that, a direction change signal (which is a logic level change) is sent to the stepper motor via the DIR port of the stepper motor driver 44.

Subsequent 100 pulses move the motor axis in reverse direction completing one cycle i.e., a half-cycle in the forward direction and a half-cycle in the rearward direction. This one complete cycle is repeated resulting in the reciprocating motion of the needle.

When the push-button switch connected to port A1 is pressed, velocity acceleration pattern 1 can be executed. When the push button switch connected to port A2 is pressed, velocity acceleration pattern 2 can be executed. When the push button switch connected to port A3 is pressed, velocity acceleration pattern 3 can be executed. Likewise, when the push button switch connected to port A4 is pressed, velocity acceleration pattern 4 can be executed. When none of the four push-button switches is pressed, constant velocity needling can be executed.

Figure 4:
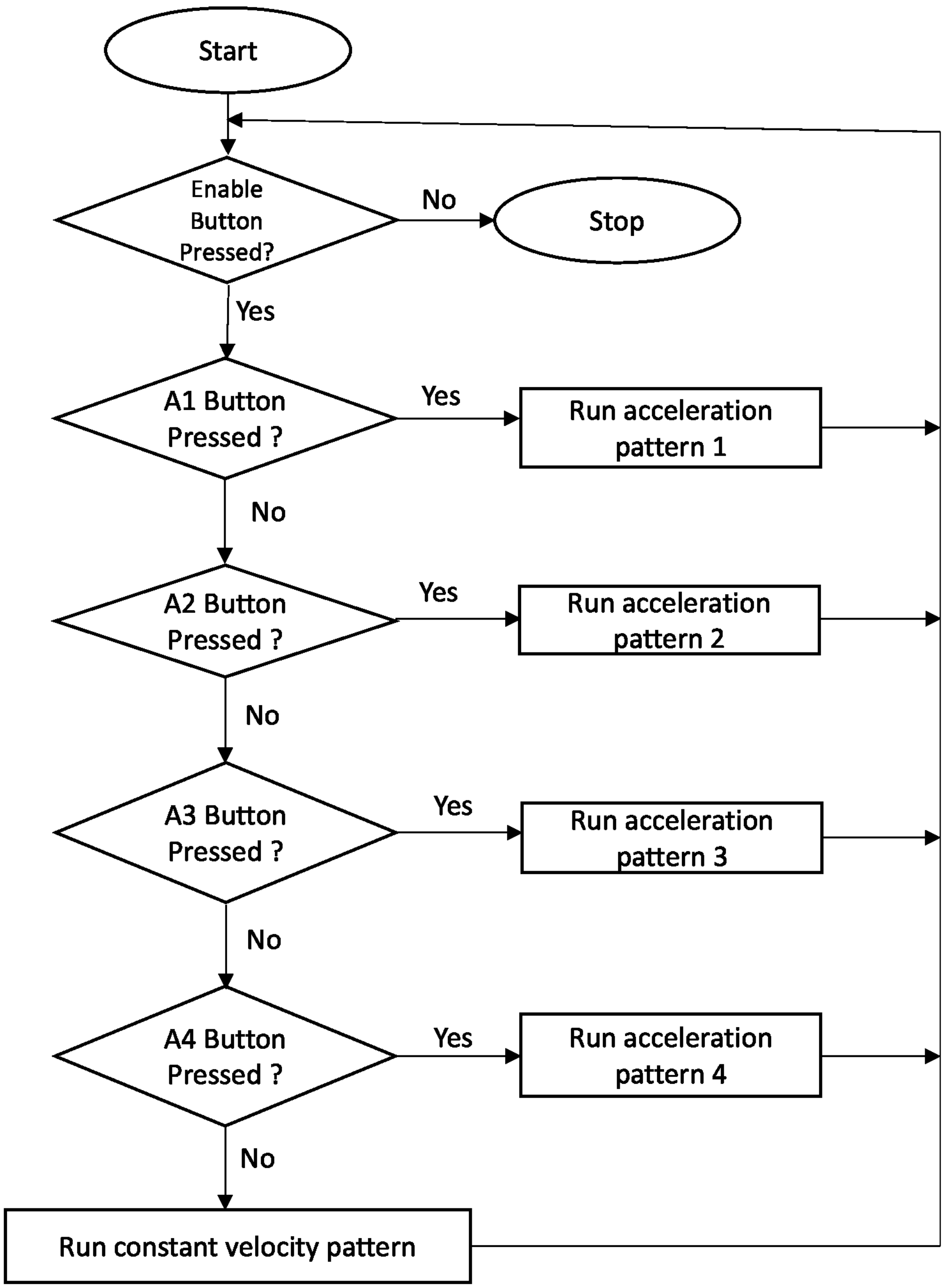
FIG. 4 is a flowchart showing a method of needling using the disclosed intramuscular stimulation needling device, according to an exemplary embodiment of the present invention.

FIG. 4 shows a flowchart illustrating an exemplary embodiment of the program of the disclosed microcontroller chip 47. The program can first check whether ENABLE button 45 of FIG. 3 is pressed. If not, the program can stop. If so, the program can check whether the push button connected to Port A1 of microcontroller chip 47 was pressed. If so, velocity acceleration pattern 1 can be executed. If not, the program checks whether the push button connected to Port A2 was pressed. If so, velocity acceleration pattern 2 can be executed. If not, the program checks whether the push button connected to Port A3 was pressed. If so, velocity acceleration pattern 3 can be executed. If not, the program checks whether the push button connected to Port A4 was pressed. If so, velocity acceleration pattern 4 can be executed. If not, the program runs a constant velocity pattern and loops back to the Starting point of the program. If any push-button is pressed during the execution of a velocity acceleration pattern, the program finishes the current pattern, after which the newly selected velocity acceleration pattern is executed. From the practitioner's point of view, the velocity acceleration pattern appears to change 'immediately' when a different pattern is chosen in the middle of the current pattern. In reality, there is some time delay—the maximum being the time corresponding to one needling pattern. The speed of the needle movement can be determined by the delay time between subsequent pulses that are delivered to stepper motor driver 44. In one embodiment, if the delay time between subsequent pulses is 0.01 sec, it will take 1 sec for 100 pulses. Since the linear actuator moves 0.1 mm per step, 100 steps mean 10 mm. This corresponds to a needle (tip) velocity of 10 mm/sec. Note that the pulse width is on the nanosecond level and this is neglected in the speed calculation. The needle tip velocity pattern of constant speed (say 10 mm/s) is shown by 38 of FIG. 2 or FIG. 2-A. The increase in needle speed can be achieved by shortening the delay time between subsequent pulses. If the delay time is 0.01 sec during the first 50 steps and the delay time is 0.0075 sec during the last 50 steps, then the needle speed for the first half of 100 steps is 10 mm/sec while the speed in the last half of 100 steps will be 13.3 mm/sec. This would be an example of one acceleration (one acceleration pattern 39 of FIG. 2 or FIG. 2-A, V1=10 mm/s and V2=13.3 mm/s). The needle speed can be increased more than once during needling. Two accelerations can be achieved as follows. The delay time is set to 0.01 sec during the first 34 steps, 0.075 sec during the second 33 steps, and 0.060 sec during the last 33 steps of 100 sec, then the needle speed for the first 34 steps of 100 steps is 10 mm/sec, the second 33 steps of 100 steps is 13.3 mm/s and the last 33 steps of 100 steps is 16.67 mm/s (two accelerations shown by the two-acceleration pattern 40 of FIG. 2 or FIG. 2-B). For three acceleration changes, the delay time can be decreased every 25 steps (of the 100 total steps). In this case, the delay time is decreased at the 26th pulse, 51st pulse, and 76th pulse. Accordingly, the velocity is increased 4 times—V1 to V2, V2 to V3, and V3 to V4. For four acceleration changes, the delay time can be decreased every 20 steps (of the 100 total steps) resulting in velocity changes from V1 to V2, V2 to V3, V3 to V4, and V4 to V5.

Ultimately, for 100 pulses, the delay time can be decreased 99 times—i.e., after each pulse. This means the velocity will be increased 99 times. V1 to V2, V2 to V3, . . . V99 to V100. However, there is a practical upper limit for the velocity increase for a given motor because as the motor speed increases, the pushing force weakens. Similarly, there can also be a lower limit for the delay time. As the number of accelerations increases, the delay time is decreased in a smaller amount after each segment. For example, if there are 11 accelerations and the delay time range is 0.01 sec to 0.005 sec, the delay time is decremented 0.005/10 sec after each segment. For example, it would be like, 0.01 sec, 0.0095 sec, 0.0090 sec, . . . , 0.0055 sec, and 0.005 sec. For 10 acceleration changes, the needling pattern can become more gradual like the one shown by profile 41 of FIG. 2 or FIG. 2-C. Preferably, for most practical purposes, 2 to 3 accelerations can be sufficient to obtain greater penetrating force suitable for needling highly contracted muscle knot areas.

It is to be understood that different velocity accelerations patterns can be programmed as when desired. For example, a software application can be provided on a mobile device, such as a smartphone that can be used to program the microcontroller. The software application can also be used to trigger the desired velocity pattern instead of buttons on the microcontroller chip 47. The mobile device can be connected to the disclosed velocity accelerometer by a wired or wireless connection. Examples of wireless connections can include Bluetooth.

The key elements in generating velocity acceleration patterns are: (1) the number of velocity changes, (2) the velocity values, and (3) the point where each velocity change occurs. The velocity is determined by the delay time in between subsequent pulses. To determine the point where the velocity change occurs, the total number of pulses corresponding to the needling depth is needed. There are two key design parameters: the distance the needle tip moves during the one-half cycle—this is called the needling depth or the stroke length—and the distance the linear actuator moves along its axis per one step pulse. The former is chosen by the designer of the device in consultation with the practitioner while the latter is obtained from the specification of the linear activator.

Figure 5:
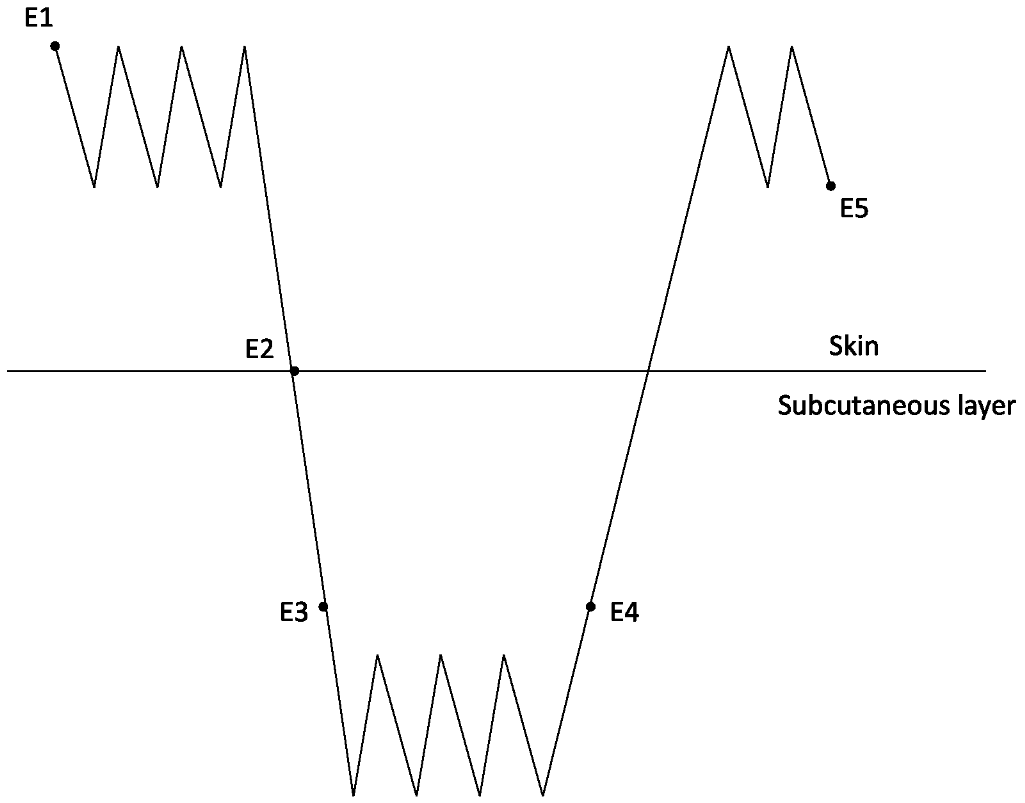
FIG. 5 is a schematic diagram showing the location of needle tip at a single muscle site, according to an exemplary embodiment of the present invention.

FIG. 5 illustrates the general needling action of an intramuscular stimulation needling device. At point E1, the practitioner can turn the intramuscular stimulation needling device on, for example, and then depressing ENABLE button in the intramuscular stimulation needling device. The needle starts to reciprocate in the air. At E2, the needle can be inserted into the skin manually up to point E3, where the needle reciprocates. At E4, the needle can be withdrawn manually and at E5, the motor can be turned off.

EXAMPLE 1

Suppose the stroke length is 10 mm and the axis moves 0.1 mm per step pulse. The number of velocity changes is 2, the three velocity values are 40 mm/sec, 50 mm/s, and 60 mm/sec; and the point where each velocity change occurs is at ⅓ and ⅔ of the half-cycle. The total number of pulses corresponding to the stroke length of 10 mm is 10 mm/0.1 mm or 100. The exact points where velocity changes are step 33 and step 66 (precisely, it has to be 33.3 and 66.6, but integers are needed for programming). The number of steps for 40 mm/s is 40 mm/0.1 mm or 400 steps/sec. A speed of 400 steps/sec is equivalent to 1 step per 0.0025 sec. So, the delay time DT1 for 40 mm/s velocity is 0.0025 sec or 2.5 msec; likewise, the delay time DT2 for 50 mm/sec velocity is 2 msec, and the delay time for 60 mm/s velocity is 1.67 msec. The velocity acceleration program proceeds as follows: (1) send out a direction logic level corresponding to 'forward' direction via port D2 of the microcontroller chip 47 of FIG. 3; (2) send out 33 pulses with DT1 of 2.5 msec via port D1 of the microcontroller, (3) send out the next 33 pulses with DT2 of 2 msec via port D1, (4) send out the next 34 pulses with DT3 of 1.67 msec via port D1. The total number of pulses is 100 for forward movement of the needle tip. The next 100 pulses are for the reverse direction to complete one needling cycle: (4) send out a direction logic level corresponding to 'reverse' direction, (5) send out 34 pulses with DT3 of 1.67 msec via port D1, (3) send out the next 33 pulses with DT2 of 2 msec via port D1, and (4) send out the next 33 pulses with DT3 of 2.5 msec via port D1. This completes one needling cycle. In this manner, any velocity acceleration pattern can be generated. For the circuit of FIG. 3, four patterns are used each having different velocity values and different sets of points for velocity changes. Note that the location where the velocity change occur is arbitrarily chosen. In other words, it does not have to be at equally spaced intervals.

With this acceleration of needling velocity, the following can be achieved: (1) LTRs can be obtained more frequently than for the case of single velocity; (2) 'rock-like' dense trigger point zone can be needled effectively, and (3) overall treatment time is shortened significantly compared with the case of single velocity intramuscular stimulators. A greater number of LTRs means enhanced treatment effectiveness and a shorter needling period means shorter treatment time for both patients and practitioners.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An intramuscular stimulation needling device comprising:

a stepper motor;

a needle configured to poke an affected muscle tissue, the needle operably coupled to the stepper motor, wherein the stepper motor is configured to reciprocate the needle within the affected muscle tissue, wherein in each needling cycle, the needle moves a predetermined distance forwardly in a first half cycle and retracts to original position in a second half cycle; and a control unit operably coupled to the stepper motor, the control unit configured to:

operate the stepper motor at a first speed;

increase a speed of the stepper motor one or more times consecutively in the first half cycle at predetermined intervals from the first speed to a second speed, wherein second speed greater than the first speed, wherein speed remains constant during an interval of the predetermined intervals; and decrease the speed of the stepper motor in the second half cycle, in a pattern reverse to the first half cycle, from the second speed to the first speed.

2. The intramuscular stimulation needling device as in claim 1, wherein the speed of the stepper motor is increased once in a middle during the first half cycle.

3. The intramuscular stimulation needling device as claim 1, wherein the stepper motor has the first speed in a first interval, a third speed at a second interval, and the second speed at a third interval, the third speed is less than the second speed, and the first, second, and third intervals are consecutive, during the first half cycle.

4. The intramuscular stimulation needling device as in claim 1, wherein the stepper motor has at three increasing speeds consecutively in three respective intervals during the first cycle.

5. The instramuscular stimulation device as in claim 1, where the speed of the stepper motor is increased a plurality of times during the first half cycle.

6. The intramuscular stimulation needling device as in claim 1, wherein the increase in speed of the stepper motor is achieved by shortening a delay time between subsequent pulses that are delivered to the stepper motor by the control unit.

7. The intramuscular stimulation needling device as in claim 1, wherein the control unit includes one or more inputs for changing the speed of the stepper motor the one or more times, wherein each input of the one or more inputs corresponds to the number of changes.

8. The intramuscular stimulation needling device as in claim 1, wherein the stepper motor runs at the first speed during change in direction of the needle.

9. The intramuscular stimulation needling device as in claim 1, wherein the increase in the speed results in shorter treatment time compared to constant speed.

10. The intramuscular stimulation needling device as in claim 1, wherein the increase in the speed results in more effective pain treatment compared to constant speed operation, wherein more local twitch responses are generated.

11. A method of intramuscular stimulation by needling as a therapeutic modality, the method comprising the steps of:

providing an intramuscular stimulation needling device comprising:

a stepper motor, a needle configured to poke an affected muscle tissue, the needle operably coupled to the stepper motor, wherein the stepper motor is configured to reciprocate the needle within the affected muscle tissue, wherein in each needling cycle, the needle moves a pre-determined distance forwardly in a first half cycle and retracts to original position in a second half cycle, and a control unit operably coupled to the stepper motor, the control unit configured to:

operate the stepper motor at a first speed, increase a speed of the stepper motor one or more times consecutively in the first half cycle at predetermined intervals from the first speed to a second speed, wherein second speed is greater than the first speed, wherein speed remains constant during an interval of the predetermimed intervals; and decrease the speed of the stepper motor in the second half cycle, in a pattern reverse to the first half cycle, from the second speed to the first speed, inserting the needle into skin to a desired depth; and selecting an option to increase the speed of the stepper motor a preset number of times of the one or more times in the first half cycle.

12. The method as in claim 11, wherein the selected option is to increase the speed of the stepper motor once during the first half cycle.

13. The method as in claim 11, wherein the selected option is to increase the speed of the stepper motor twice during the first half cycle.

14. The method as in claim 11, wherein the selected option is to increase the speed of the stepper motor thrice during the first half cycle.

15. The method as in claim 11, wherein the increase in the speed of the stepper motor is achieved by shortening a delay time between subsequent pulses that are delivered to the stepper motor by the control unit.

16. The method as in claim 11, wherein the option is provided as one or more inputs in the control unit for changing the speed of the stepper motor one or more times, wherein each input of the one or more inputs corresponds to the change in speed.

* * * * *